(12) United States Patent
Bawn

(10) Patent No.: US 12,710,591 B2
(45) Date of Patent: Aug. 18, 2026

(54) METHOD FOR DIVIDING OPTICAL FIBRE

(71) Applicant: Microsoft Technology Licensing, LLC, Redmond, WA (US)

(72) Inventor: Simon Bawn, Romsey (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 18/546,389

(22) PCT Filed: Feb. 14, 2022

(86) PCT No.: PCT/GB2022/050395
§ 371 (c)(1),
(2) Date: Aug. 14, 2023

(87) PCT Pub. No.: WO2022/175647
PCT Pub. Date: Aug. 25, 2022

(65) Prior Publication Data

US 2024/0134120 A1 Apr. 25, 2024
US 2024/0230998 A9 Jul. 11, 2024

(30) Foreign Application Priority Data

Feb. 17, 2021 (GB) .................................. 2102221.5

(51) Int. Cl.
*G02B 6/245* (2006.01)
*G02B 6/02* (2006.01)
*G02B 6/25* (2006.01)

(52) U.S. Cl.
CPC ......... *G02B 6/245* (2013.01); *G02B 6/02328* (2013.01); *G02B 6/25* (2013.01)

(58) Field of Classification Search
None
See application file for complete search history.

(56) References Cited

U.S. PATENT DOCUMENTS

2004/0008955 A1 1/2004 Patlakh
2015/0205044 A1* 7/2015 Kashyap ................ G02B 6/245 427/163.2
2017/0123147 A1* 5/2017 Brown ............... G02B 6/02328
(Continued)

FOREIGN PATENT DOCUMENTS

CN 111443039 A * 7/2020 ............. G01N 21/01
EP 0509737 A2 10/1992
(Continued)

OTHER PUBLICATIONS

CN-111443039-A EPO Machine Translation retrieved Aug. 7, 2025. (Year: 2025).*

(Continued)

*Primary Examiner* — Lisa L Herring

(57) ABSTRACT

A method for dividing an optical fibre comprises providing a hollow core optical fibre having a length, a cladding which comprises a microstructure, a hollow core surrounded by the cladding, and a negative pressure portion in which the pressure is below atmospheric pressure that extends over at least a portion of the length; and cleaving the hollow core optical fibre at a divide location within the negative pressure portion to divide the hollow core optical fibre into two parts and provide an end facet at the divide location on one or both of the parts.

20 Claims, 5 Drawing Sheets

(56) References Cited

U.S. PATENT DOCUMENTS

| | | | | |
|---|---|---|---|---|
| 2018/0215062 | A1* | 8/2018 | Böttcher | H02G 1/1253 |
| 2021/0356667 | A1* | 11/2021 | Murgatroyd | G02B 6/25 |

FOREIGN PATENT DOCUMENTS

| | | | | |
|---|---|---|---|---|
| JP | H04314004 A | 11/1992 | | |
| JP | 2002541507 A | 12/2002 | | |
| WO | 00/60388 A1 | 10/2000 | | |
| WO | WO-2004111695 A1 * | 12/2004 | | H01S 3/06708 |

OTHER PUBLICATIONS

Komanec et al., "Hollow-Core Optical Fibers", Radio Engineering, vol. 29, No. 3, Sep. 2020, pp. 417-430. (Year: 2020).*

Xiao et al., "Integrated hollow-core fibers for nonlinear optofluidic applications", Optics Express vol. 21, No. 23, Nov. 2013, pp. 28751-28757. (Year: 2013).*

International Search Report for International Application No. PCT/GB2022/050395 mailed Apr. 26, 2022 (3 pages).

Communication under Rule 71(3) received for European Application No. 22704793.3, mailed on Sep. 9, 2025, 7 Pages.

Decision to grant a European patent pursuant to Article 97(1) received in European Application No. 22704793.3, mailed on Dec. 18, 2025, 2 Pages.

First Office Action Received for Chinese Application No. 202280014940.9, mailed on Mar. 31, 2026, 11 Pages. (English Translation Provided).

Notice of Reasons for Refusal Received for Japanese Application No. 2023-549903, mailed on Apr. 24, 2026, 07 pages. (English translation Provided).

* cited by examiner

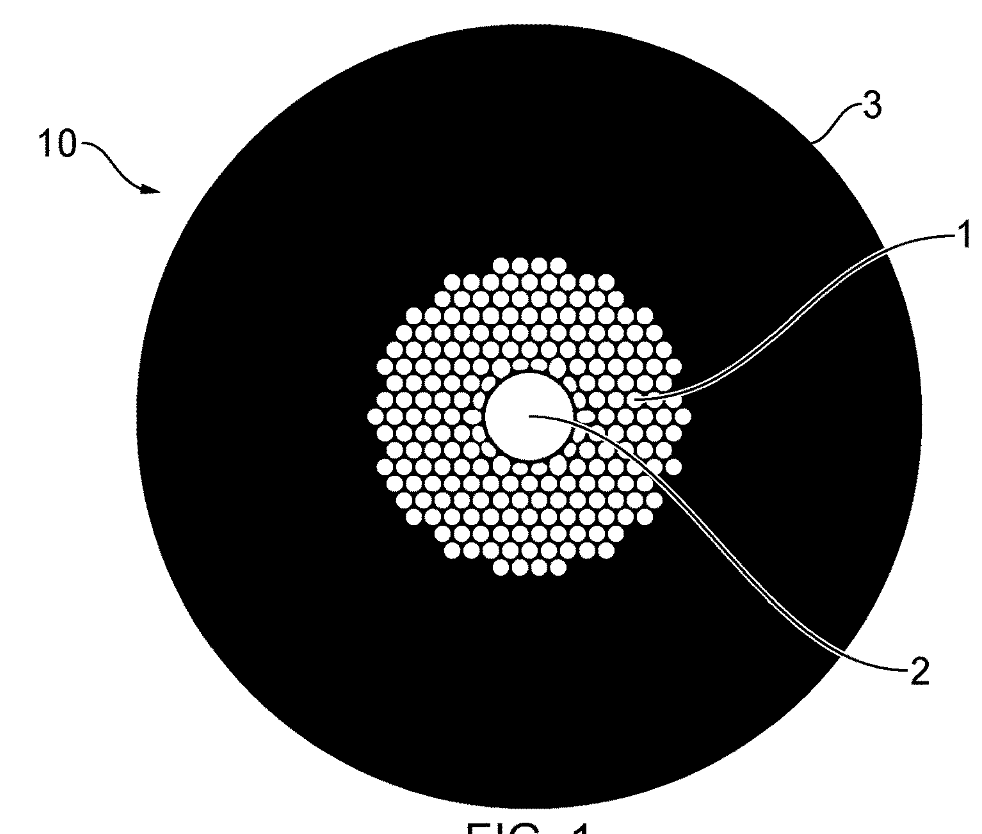
FIG. 1
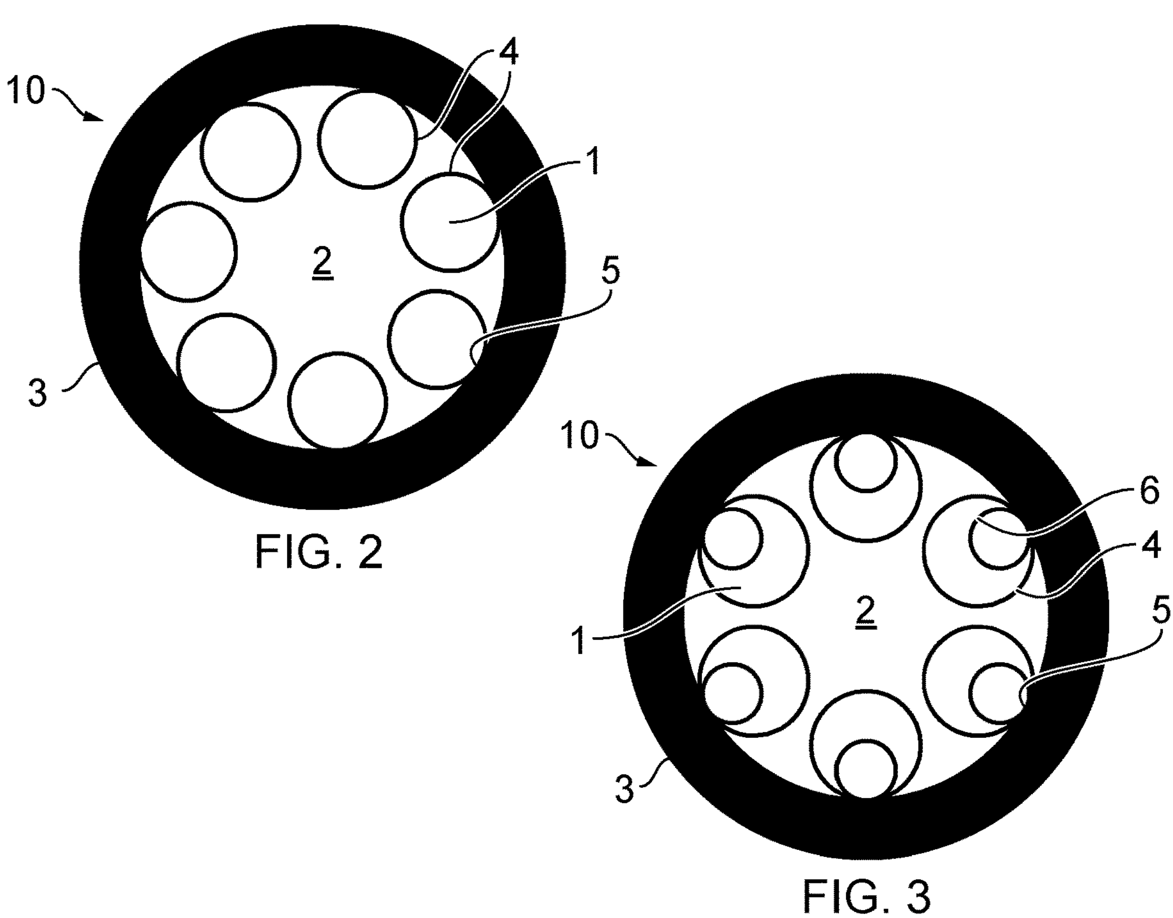
FIG. 2
FIG. 3

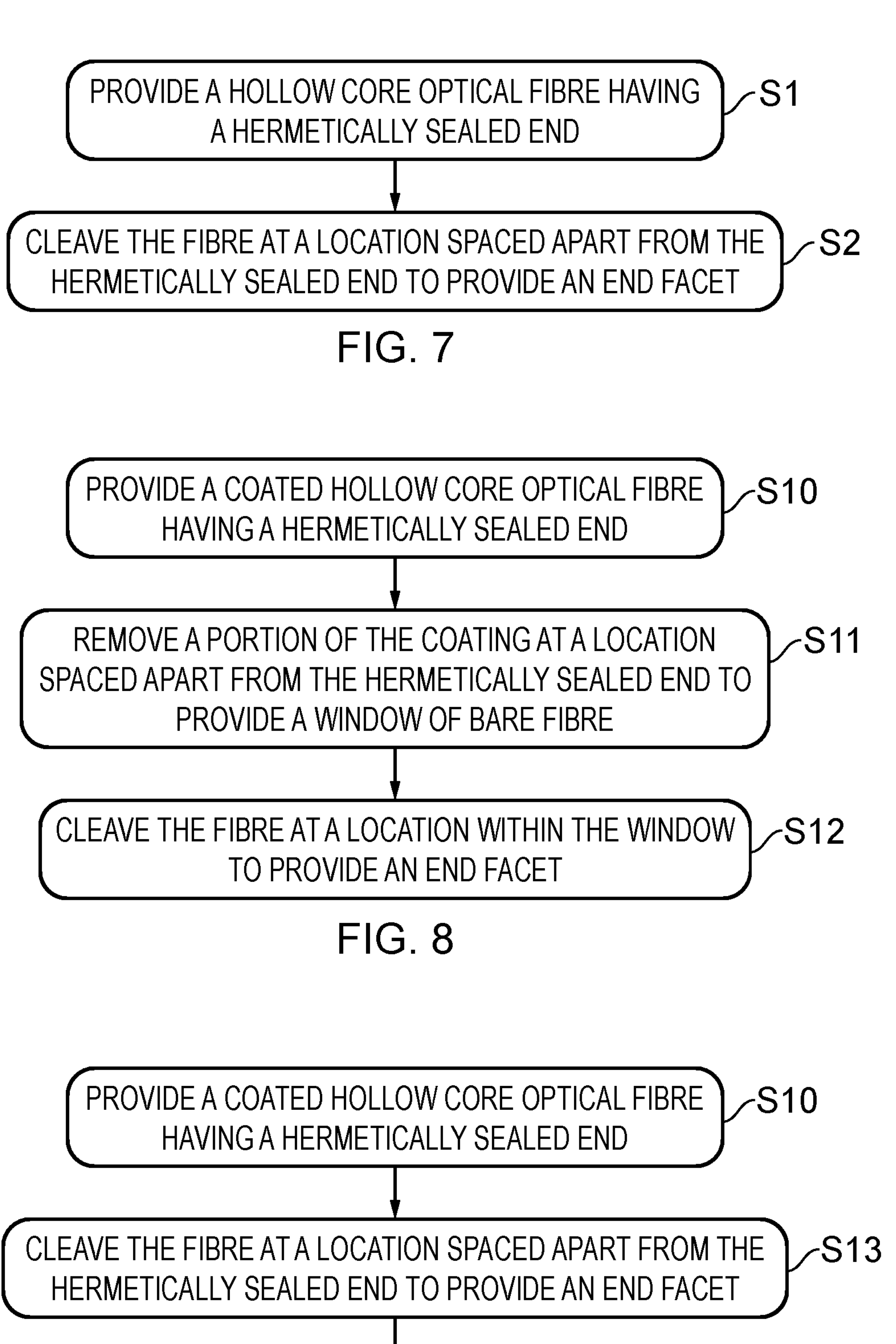
PROVIDE A HOLLOW CORE OPTICAL FIBRE HAVING A HERMETICALLY SEALED END
S1
CLEAVE THE FIBRE AT A LOCATION SPACED APART FROM THE HERMETICALLY SEALED END TO PROVIDE AN END FACET
S2
FIG. 7
PROVIDE A COATED HOLLOW CORE OPTICAL FIBRE HAVING A HERMETICALLY SEALED END
S10
REMOVE A PORTION OF THE COATING AT A LOCATION SPACED APART FROM THE HERMETICALLY SEALED END TO PROVIDE A WINDOW OF BARE FIBRE
S11
CLEAVE THE FIBRE AT A LOCATION WITHIN THE WINDOW TO PROVIDE AN END FACET
S12
FIG. 8
PROVIDE A COATED HOLLOW CORE OPTICAL FIBRE HAVING A HERMETICALLY SEALED END
S10
CLEAVE THE FIBRE AT A LOCATION SPACED APART FROM THE HERMETICALLY SEALED END TO PROVIDE AN END FACET
S13
OPTIONALLY REMOVE A PORTION OF THE COATING ADJACENT TO THE END FACET
S14
FIG. 9

PROVIDE A HOLLOW CORE OPTICAL FIBRE HAVING A NEGATIVE PRESSURE PORTION

S30

APPLY A SEPARATING TECHNIQUE CONFIGURED TO ELIMINATE SHARD FORMATION

S31

SEPARATE THE FIBRE AT A LOCATION IN THE NEGATIVE PRESSURE PORTION TO DIVIDE IT INTO TWO PARTS

S32

METHOD FOR DIVIDING OPTICAL FIBRE

CROSS-REFERENCE TO RELATED APPLICATIONS

This application is a National Stage of PCT/GB2022/050395 filed Feb. 14, 2022, which claims the benefit of Application No. 2102221.5 filed Feb. 17, 2021, in Great Britain, entitled "Method for Dividing Optical Fibre", which is incorporated herein by reference in its entirety.

BACKGROUND OF THE INVENTION

The present invention relates to methods for dividing optical fibres.

Optical fibres have a variety of uses and applications, many of which require one or both ends of a length of fibre to be neatly prepared to provide a clean, highly smooth and defect-free end facet. A neat facet reduces optical loss for light coupling into and out of the fibre, and allows lower losses when the fibre end is joined, or spliced, to an end of another fibre or other optical element. The preparation of the fibre end can be achieved by cleaving to provide an end facet which is planar, free from debris and contaminants, and also free from damage to fibre material and structure.

Cleaving can be relatively straightforward for all-solid optical fibres, in which both the cladding and the core of the fibre are defined by solid material, such as silica, having different refractive indices to provide an optical waveguiding mechanism that allows light to propagate along the fibre by total internal reflection at the core-cladding boundary. In contrast, hollow core optical fibres can be more difficult to cleave, and to sever more generally. These fibres have a core in the form of a central longitudinal void, and a microstructured cladding which comprises a plurality of longitudinal capillaries surrounding the core in a predefined structure. The design of the microstructure determines the nature of the waveguiding mechanism that operates in the hollow core fibre. The internal structure of a hollow core fibre is fragile and delicate, and prone to damage during processing of the fibre. This can give a poor end facet, leading in turn to optical loss in the fibre and at splices between the fibre and other elements. Hollow core fibres can have particularly low loss, making them attractive for applications in which preservation of optical power is important, such as long-haul telecommunications. Circumstances that increase the loss, such as a poor quality end facet, are therefore undesirable.

Accordingly, techniques for dividing hollow core optical fibres are of interest.

SUMMARY OF THE INVENTION

Aspects and embodiments are set out in the appended claims.

According to a first aspect of certain embodiments described herein, there is provided a method for dividing an optical fibre, comprising: providing a hollow core optical fibre having a length, a cladding which comprises a microstructure, a hollow core surrounded by the cladding, and a negative pressure portion in which the pressure is below atmospheric pressure that extends over at least a portion of the length; and cleaving the hollow core optical fibre at a divide location within the negative pressure portion to divide the hollow core optical fibre into two parts and provide an end facet at the divide location on one or both of the parts.

According to a second aspect of certain embodiments described herein, there is provided a method for dividing an optical fibre, comprising: providing a hollow core optical fibre having a length, a cladding which comprises a microstructure, a hollow core surrounded by the cladding, and a negative pressure portion in which the pressure is below atmospheric pressure that extends over at least a portion of the length; and separating the hollow core optical fibre at a divide location within the negative pressure portion to divide the hollow core optical fibre into two parts, using a separating technique configured to avoid formation of shards from the microstructure.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods may be provided in accordance with approaches described herein which include any one or more of the various features described below as appropriate.

BRIEF DESCRIPTION OF THE DRAWINGS

For a better understanding of the invention and to show how the same may be carried into effect reference is now made by way of example to the accompanying drawings in which:

FIG. 1 shows a transverse cross-sectional view of an example of a photonic bandgap hollow core microstructured optical fibre (HCPBF);

FIG. 2 shows a transverse cross-sectional view of a first example antiresonant hollow core microstructured optical fibre;

FIG. 3 shows a transverse cross-sectional view of a second example antiresonant hollow core microstructured optical fibre;

FIG. 7 shows a flow chart of steps in a first example method for dividing a closed hollow core optical fibre by cleaving according to the present disclosure;

FIG. 8 shows a flow chart of steps in a second example method for dividing a closed hollow core optical fibre by cleaving according to the present disclosure;

FIG. 9 shows a flow chart of steps in a third example method for dividing a closed hollow core optical fibre by cleaving according to the present disclosure;

DETAILED DESCRIPTION

Figure 4:
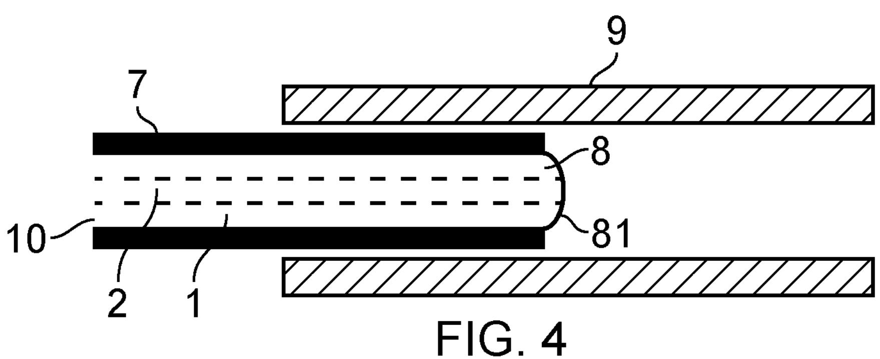
FIG. 4 shows schematic longitudinal cross-sectional view of a hollow core optical fibre with a closed or sealed end.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of methods and optical fibres discussed herein which are not described in detail may be implemented in accordance with any conventional techniques for implementing such aspects and features.

A class of optical fibres that may be termed hollow core fibres or microstructured fibres have a structure comprising an array or arrangement of holes, capillaries or lumen within the fibre material, extending along the length of the fibre parallel to the longitudinal axis and defined within a material such as glass. The arrangement of holes can be termed a microstructure, and typically the microstructure forms at least part of the cladding of the fibre, and surrounds a central hollow void or region that provides a core, and which may be filled with air or another gas, or a vacuum. The capillaries of the microstructure are typically supported within a larger outer cladding tube made from glass. For practical purposes, the outer cladding tube may be covered in a protective coating layer formed from a polymer material. For some applications, a plurality of fibres which may each have a coating, may be bundled together in parallel inside an external jacket layer to form a cable. For example, a cable may be deployed as an optical telecommunications link, able to carry multiple signal channels between a first location and a second location which may be many kilometres apart. At each end of the cable, the individual fibres are free from the jacket and will be spliced to optical input and output apparatus, possibly via lengths of solid core optical fibre, in order to receive and deliver optical signals. Formation of the splices requires cleaving of the hollow core fibres, typically outside of a laboratory environment and in the field so that robust techniques are required which can nevertheless minimise damage to the fragile structure of the hollow core fibre so that significant optical losses are not incurred.

As noted above, hollow core optical fibre has a light-guiding core comprising a central void surrounded by a cladding region comprising a structured arrangement of longitudinal capillaries extending along the fibre length: the microstructure. The propagation of light in air enabled by the absence of a solid glass core reduces the proportion of a guided optical wave which propagates in glass compared to a solid core fibre, offering benefits such as increased propagation speed, reduced loss from both absorption and scattering, and reduced nonlinear interactions. Hence hollow core fibres are very attractive for telecommunications applications; they enable data transmission at nearly the speed of light in vacuum, and at higher optical powers and over broader optical bandwidths, with relative freedom from issues such as nonlinear and thermo-optic effects that can affect light travelling in solid fibres.

Hollow core fibres can be categorised according to their mechanism of optical guidance into two principal classes or types: hollow core photonic bandgap fibre (HCPBF, alternatively referred to as hollow core photonic crystal fibre, HCPCF) [1], and antiresonant hollow core fibre (AR-HCF or ARF) [2]. There are various subcategories of ARFs characterised by their geometric structure, including kagome fibres [3], nested antiresonant nodeless fibres (NANFs) [4] and tubular fibres [5]. The present disclosure is applicable to all types of hollow core fibre, including these two main classes and their associated sub-types plus other hollow core designs. Note that in the art, there is some overlapping use of terminologies for the various classes of fibre. For the purposes of the present disclosure, the terms "hollow core fibre" and "hollow core microstructured fibre" are intended to cover all types of these fibres having a hollow core as described above. The terms "HCPBF" and "HCPCF" are used to refer to hollow core fibres which have a structure that provides waveguiding by photonic bandgap effects (described in more detail below). The terms "ARF" and "antiresonant hollow core fibre" are used to refer to hollow core fibres which have a structure that provides waveguiding by antiresonant effects (also described in more detail below).

FIG. 1 shows a cross-sectional view of an example HCPBF 10. In this fibre type, a structured, inner, cladding 1 comprises a regular closely packed array of many small glass capillaries, from which a central group is excluded to define a substantially circular hollow core 2. The periodicity of the cladding structure provides a substantially periodically structured refractive index and hence a photonic bandgap effect that confines the propagating optical wave towards the core. These fibres can be described in terms of the number of cladding capillaries or "cells" which are excluded to make the core 2. In the FIG. 1 example, the central nineteen cells from the array are absent in the core region, making this a 19-cell core HCPBF. The structured cladding 1 is formed from six rings of cells surrounding the core 2, plus some cells in a seventh ring to improve the circularity of the outer surface of the structured cladding 1. An outer cladding 3 surrounds the structured cladding 1; this is a tube that supports the capillaries of the structured cladding 1.

In contrast to HCPBF, antiresonant hollow core fibres guide light by an antiresonant optical guidance effect. The structured cladding of ARFs has a simpler configuration, comprising a much lower number of larger glass capillaries or tubes than a HCPBF to give a structure lacking a high degree of periodicity so that photonic bandgap effects are not significant, but with some periodicity on a larger scale since the tubes are evenly spaced. The structure means that antiresonance is provided for propagating wavelengths which are not resonant with a wall thickness of the cladding capillaries, in other words, for wavelengths in an antiresonance window which is defined by the cladding capillary wall thickness. The cladding capillaries surround a central void or cavity which provides the hollow core of the fibre, and which is able to support antiresonantly-guided optical modes. The structured cladding can also support cladding modes able to propagate primarily inside the capillaries, in the glass of the capillary walls or in the spaces or interstices between the cladding capillaries and the fibre's outer cladding. The loss of these additional non-core guided modes is generally very much higher than that of the core guided modes. The fundamental core guided mode typically has by far the lowest loss amongst the core guided modes. The antiresonance provided by a capillary wall thickness which is in antiresonance with the wavelength of the propagating light acts to inhibit coupling between the fundamental core mode and any cladding modes, so that light is confined to the core and can propagate at very low loss.

FIG. 2 shows a transverse cross-sectional view of an example simple antiresonant hollow core fibre. The fibre 10 has an outer tubular cladding 3. The structured, inner, cladding 1 comprises a plurality of tubular cladding capillaries 4, in this example seven capillaries of the same cross-sectional size and shape, which are arranged inside the outer cladding 3 in a ring, so that the longitudinal axes of each cladding capillary 4 and of the outer cladding 3 are substantially parallel. Each cladding capillary 4 is in contact with (bonded to) the inner surface of the outer cladding 3 at a location 5, such that the cladding capillaries 4 are evenly spaced around the inner circumference of the outer cladding 3, and are also spaced apart from each other so there is no contact between neighbouring capillaries. In some designs of ARF, the cladding tubes 4 may be positioned in contact with each other (in other words, not spaced apart as in FIG. 2), but spacing to eliminate this contact can improve the fibre's optical performance. The spacing removes nodes that arise at the contact points between adjacent tubes and which tend to cause undesirable resonances that result in high losses. Accordingly, fibres with spaced-apart cladding capillaries may be referred to as "nodeless antiresonant hollow core fibres".

The arrangement of the cladding capillaries 4 in a ring around the inside of the tubular outer cladding 3 creates a central space, cavity or void within the fibre 10, also with its longitudinal axis parallel to those of the outer cladding 3 and the capillaries 4, which is the fibre's hollow core 2. The core 2 is bounded by the inwardly facing parts of the outer surfaces of the cladding capillaries 4. This is the core boundary, and the material (glass or polymer, for example) of the capillary walls that make up this boundary provides the required antiresonance optical guidance effect or mechanism. The capillaries 4 have a thickness at the core boundary which defines the wavelength for which antiresonant optical guiding occurs in the ARF.

FIG. 3 shows a transverse cross-sectional view of a second example ARF. The ARF 10 has a structured inner cladding 1 comprising six cladding capillaries 4 evenly spaced apart around the inner surface of a tubular outer cladding 3 and surrounding a hollow core 2. Each cladding capillary 4 has a secondary, smaller capillary 6 nested inside it, bonded to the inner surface of the cladding capillary 4, in this example at the same azimuthal location 5 as the point of bonding between the primary capillary 4 and the outer cladding 3. These additional smaller capillaries 6 can reduce the optical loss. Additional still smaller tertiary capillaries may be nested inside the secondary capillaries 6. ARF designs of this type, with secondary and optionally smaller further capillaries, may be referred to as "nested antiresonant nodeless fibres", or NANFs. In other NANF designs, one or more additional capillaries may be nested at azimuthal locations which are different from the point of bonding between the primary capillary and the outer cladding. A pair of additional capillaries may be equally or unequally displaced from the point of bonding, for example.

Many other capillary configurations for the structured cladding of an ARF are possible, and the disclosure is not limited to the examples described above. For example, the capillaries need not be of circular cross-section, and/or may or may not be all of the same size and/or shape. The number of capillaries surrounding the core may be for example, four, five, six, seven, eight, nine, ten or more.

Hollow core optical fibres may be made from any of the glass-based materials known for the fabrication of hollow core fibres, in particular silica. Types of glass include "silicate glasses" or "silica-based glasses", based on the chemical compound silica (silicon dioxide, or quartz), of which there are many examples. Other glasses suitable for optical fibres include, but are not limited to, doped silica glasses. The materials may include one or more dopants for the purpose of tailoring the optical properties of a fibre, such as modifying absorption or transmission, or tailoring properties of the materials for purposes such as facilitating fibre manufacture, improving reliability, or enabling or enhancing a particular end use. Fibres may also be made from polymer materials.

Herein, terms including hollow core optical fibre, hollow core fibre, hollow core waveguide, hollow core optical waveguide, hollow core microstructured fibre, hollow core microstructured waveguide, and similar terms are intended to cover optical waveguiding structures configured according to any of the above examples and similar structures, where light is guided by any of several guidance mechanisms (photonic bandgap guiding, antiresonance guiding, and/or inhibited coupling guiding) in a hollow elongate void or core surrounded by a structured (microstructured) cladding comprising a plurality of longitudinal capillaries. These various terms may be used interchangeably in the present disclosure.

After fabrication of a hollow core fibre by drawing the fibre from a preform or a cane in the usual optical fibre fabrication manner, the open ends of the fibre may be closed. This is to inhibit or prevent the ingress of contaminants such as particulate matter or moisture which could degrade the fibre's optical performance. The closure is a partial or complete closure of the open ends of each of the holes in the fibre, providing at least a partial seal at the end of the fibre. In some cases, the seal may be complete so as to seal the fibre against atmospheric pressure, providing a hermetic seal. Even for a non-hermetic seal or partial closure, the very small size of the hollow core and cladding capillaries greatly inhibits air flow so there is little air exchange with the fibre interior. The closing or sealing may be achieved by exposing the fibre to sufficient heat to soften or melt the glass at or near the fibre end, in order to cause the capillaries to collapse. A complete collapse can provide a hermetic seal. The heat may be provided using a fusion splicing device, for example, that provides an electrical arc or a laser beam that can be applied to the fibre end. Other closing techniques include applying adhesive such as a hot melt glue across the end of the fibre, or applying a suitable liquid to the fibre end that blocks the holes, dries and hardens in the atmosphere or under curing, such as exposure to ultraviolet light. Other methods may also be used. In the present disclosure, fibre ends may be referred to as closed or sealed, meaning they have been processed in one of these ways (or another way) in order to inhibit contaminants from entering the fibre; and a closed or sealed end may or may not comprise a hermetic seal. Regardless of method the sealed end may then be packaged into a protective casing or otherwise encapsulated in order to protect the seal during packaging, storing, shipment and deployment of the fibre. For example, a splice protector comprising a stainless steel reinforced plastic tube that slips over and encases the fibre end may be used, the tube being secured in place with adhesive or similar.

FIG. 4 shows a schematic longitudinal cross-sectional view of a hollow core fibre end with a packaged seal, which may be hermetic, and that acts to provide the fibre with a closed end. The fibre 10 has, as described above, a hollow core 2 inside a microstructured cladding 1, and has a protective coating 7 as an exterior layer. Optical fibre coatings are often formed from multi-functional ultraviolet curable acrylate materials, but any suitable material can be used; the current disclosure is not limited in this regard. The coating 7 extends towards a seal 81 at the end 8 of the fibre 10. In this example, the seal 81 is depicted as being at the very end or tip of the fibre 10, but its actual location may be somewhat inward from the fibre tip if this is more convenient for the method used to create the seal. For example, sealing by heating to collapse the capillaries is more practically carried out away from the fibre tip, by holding the fibre in two places and applying heat to the fibre between these places. Similarly, the coating may extend to the fibre tip as depicted, or it may be removed from an end part of the fibre to enable sealing. For example, the coating may be removed to allow sealing by heating in order not to burn the coating. Removed coating may be reinstated. Optionally, a protective tube 9 is secured over the fibre end 8 to package and protect the hermetic seal.

In order to use the fibre, the closed end (and any protection provided for the seal) needs to be removed from the end of the hollow core fibre, to allow optical access to the fibre interior. This is typically done by a simple cutting action through the fibre with scissors or a knife, or even by bending the fibre until it breaks, and can be a first step in otherwise preparing the fibre end for use. For example, cutting away the sealed end of the fibre is a first step in a conventional technique for cleaving a hollow core fibre in order to obtain an end facet for splicing.

Figure 5A:
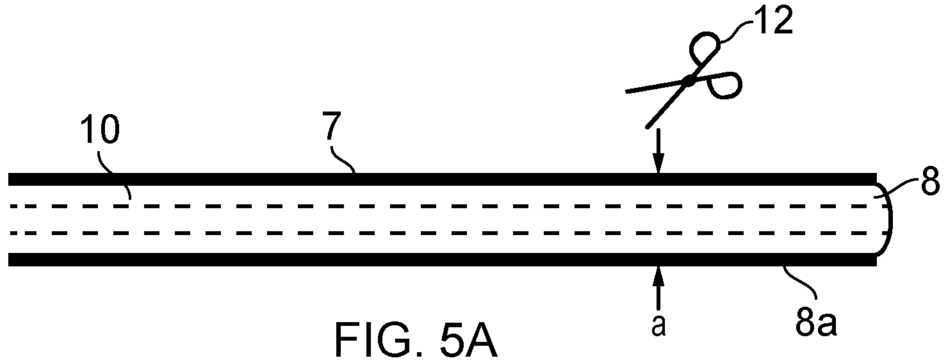
FIGS. 5A to 5D show, as schematic longitudinal cross-sectional views, steps in a conventional method for cleaving a closed hollow core optical fibre.

FIGS. 5A to 5D show, as schematic longitudinal cross-sectional views, steps in the preparation of a fibre end for use, such as for splicing. This is a conventional technique for stripping and cleaving the ends of solid core optical fibre which has been adopted unchanged for use with hollow core fibres. FIG. 5A shows the fibre 10 having an end 8 which is sealed as described with regard to FIG. 4. Packaging of the sealed end as depicted in FIG. 4 has been omitted for clarity, but is generally present. The fibre 10 has an exterior coating 7 extending along to the sealed end. In order to remove the seal, the fibre 10 is severed or cut with scissors (for example scissors suitable for cutting Kevlar® or a knife 12 at a position a inwardly spaced from the sealed end, in order to remove an end portion 8*a* of the fibre 10 that includes the seal (closed end). The cut is typically a single cutting motion passing through the coating 7 and the glass of the fibre 10.

Figure 5B:
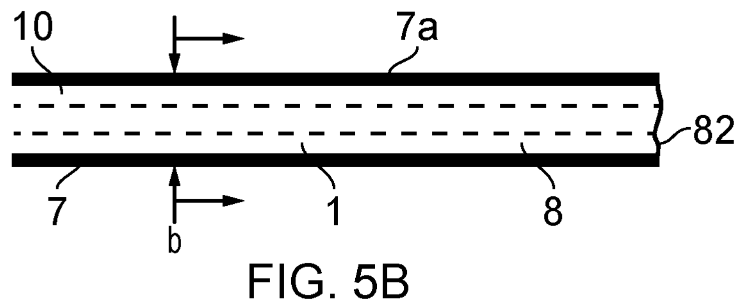

FIG. 5B shows the fibre 10 after the end portion 8*a* has been removed. The new end 8 of the fibre 10 has a relatively rough end face 82 produced by cutting off the end portion 8*a*. Preparing the fibre end 8 for use includes cleaving to improve the end into the form of an end facet, in contrast to the rough end face 82 obtained from the cutting action. Cleaving can be most effective if performed on a bare fibre, so a next step in the preparation is the removal of an end portion 7*a* of the coating 7, extending between a position b inwardly spaced from the end face 82, and the end face 82. The coating may be removed using a stripping tool or other blade which cuts or bites into the coating 7 at the required position b without penetrating into, or otherwise damaging, the cladding 1. The end portion 7*a* of the coating is thereby separated from the bulk of the coating 7 and can be pulled off the fibre end 8 along a direction parallel to the length of the fibre 10, indicated by the arrows in the figure. This is analogous to the stripping of coated electrical wire preparatory to making an electrical connection with the wire. The removal of the sealed end in the previous step can enable removal of the coating in this way; a bulky packaged seal present at the fibre end can hinder coating removal.

Figure 5C:
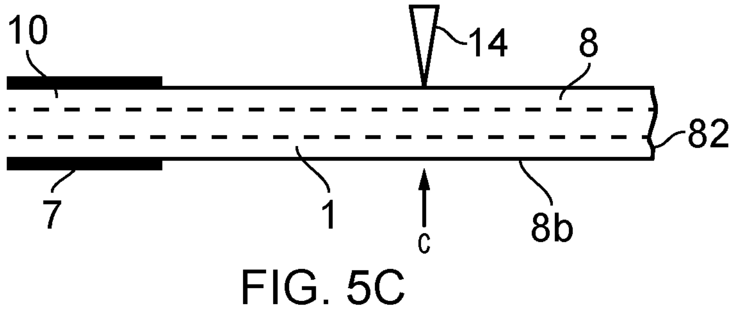

FIG. 5C shows the fibre 10 after removal of the end portion 7*a* of the coating 7. The end 8 of the fibre 10 is now bare, having been stripped of its coating. The outer surface is cleaned in order to remove any contaminants that could be transferred to the end facet in the cleaving process. A location c is identified for cleaving, positioned along the bare part of the fibre between the end face 82 and the position b from which the coating has been removed. A portion 8*b* of the fibre end 8 extending from the cleave position c to the end face 82 will be removed to produce a cleaved end facet. A cleaving tool 14 is used to cleave the fibre 10 at the location c.

Figure 5D:
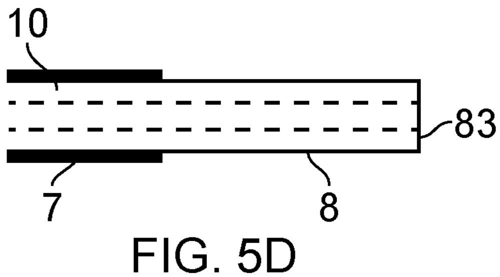

FIG. 5D shows the fibre 10 after cleaving to remove the portion 8*b*. A planar, orthogonal and clean end facet 83 which may be directly suitable for splicing to another fibre end or other optical element has been produced for the fibre end 8.

Cleaving of a hollow core fibre, in the current disclosure, is intended to describe a process which aims to produce a clean, smooth and undamaged or largely damage-free end face for the optical fibre. It is a refined procedure requiring skill for a successful outcome, and is distinct from cruder methods of severing a fibre, such as cutting with scissors, shears or a knife, or breaking, which produce a fibre end which is potentially of poor optical quality with damage or surface roughness, in particular damage to the microstructure of the hollow core fibre. In contrast, the fibre end face achieved by cleaving can be referred to as an end facet, to indicate its superior quality. Cleaving can produce end facets of optical quality, which are directly suitable for splicing to other optical fibres (hollow core or solid core) and other optical elements. Less perfect end facets may also be achieved by cleaving, but may still be considered as clean and neat fibre ends in which the cleaving technique has avoided or largely avoided causing damage to the microstructure.

This conventional cleaving approach would be expected to produce a usable low loss end facet, in line with the result achievable with solid core fibres. Unexpected losses have been observed after cleaving, however, even when a high optical quality end facet has been achieved. A wide range of values of additional optical loss have been measured for light propagating in hollow core optical fibres with a first cleaved end facet made directly after removing the seal from the fibre end, from 0 dB to about 20 dB. The loss value recorded is random, highly variable and independent of factors such as the capillary stack used to make a preform for the fibre, the preform from which the fibre was drawn, any intermediate cane from which the fibre was drawn, the drawing process, and the state of the other end of the length of fibre. This additional loss is undesirable, for example if the fibre is used for a telecommunications link, the transmitted data can be degraded by the loss of signal power. Issues also arise in installing the fibre for use. Alignment of the fibre end for splicing is made more difficult and can require a power alignment technique in which access to the other end of the fibre is needed to measure transmitted power; this is impractical for very long fibre lengths. Installation of the fibre thereby becomes more costly and time-consuming.

Interestingly, the additional loss can be reduced by additional cleaving, to cut back the end of the fibre progressively further and further. It has been observed that typically the loss drops in an unpredictable manner with each new cleave until a point is reached at which the loss is stable and is not reduced further with more cleaving. The amount of fibre that may need to be removed to achieve this is also unpredictable. Also, a reasonable proportion of fibres show no increased loss for the first cleave. After a stable loss value is achieved, the additional loss can recur if the fibre end is resealed, and then cut and cleaved again at a later time.

A possible explanation for this is the formation of crystals of ammonium chloride on the end facet of a cleaved fibre. This is a known issue with hollow core fibres made from glasses that contain chlorine [6]. The crystals form on cleaved surfaces and build up over time. However, similar random additional losses have been identified for hollow core fibres made from low chlorine glass, for which there is no ammonium chloride crystal formation on cleaved facets. Accordingly, crystal growth has been rejected as the source of the random additional loss.

Instead, other investigation has revealed a different explanation.

The fabrication of hollow core fibres often includes the use of pressurisation. Pressures are applied within the various voids in a preform or cane as it is drawn into a fibre in order to maintain and achieve the desired relative sizes of the holes and the core [7]. Pressurisation is necessary to prevent the microstructure collapsing under the influence of surface forces as the fibre is drawn. The pressures used for this purpose, although relatively small (equivalent to altitude changes of around 1000 m, or extreme weather conditions), are always positive with respect to the external atmosphere. (Vacuum is sometimes used in fibre drawing, but always to promote the collapse of a void, such as between a cane and a jacket tube). Surprisingly, though, the pressure inside an as-drawn fibre is a negative pressure, below or significantly below atmospheric pressure (being the pressure in the fibre's surrounding environment), rather than corresponding to the positive pressures applied during drawing [8].

There are two reasons for this. Firstly, the positive pressures are obtained by filling the voids with pressurised gas, and these are at the high temperature within the draw furnace, which may be of the order of 2000° C. As the drawn fibre passes out of the furnace it cools, and the internal gas with it. As the internal gas cools, its pressure drops (in all portions of the microstructure) and while this tends to draw in gas, still hot, from the heated part of the fibre still in the furnace, the resistance to gas flow caused by the small size of the capillaries in the microstructure limits the amount of gas which can flow and so limits the recovery of the pressure to atmospheric pressure. Secondly, while it is necessary that the volume of glass entering the furnace as the preform is equal to the volume exiting the furnace as the fibre, there is no corresponding constraint on the volume of the voids. In many hollow core fibre designs the total void volume in the fibre (also known as the air filling fraction) exceeds that in the original preform.

The ends of the fibre are typically closed or sealed soon after drawing, so the pressure conditions within the fibre become preserved. For short fibre lengths, the pressure inside the fibre may have time to equilibrate with the atmosphere before closing or sealing takes place. For long fibres, such as the many kilometres required for telecommunications links, the substantial fibre length combined with the resistance to gas flow presented by the very small width of the various voids prevents equilibration before the fibre ends are sealed. Hence the fibre interior remains at a negative pressure. Indeed, for long fibres, negative pressure can be present away from end parts of a hollow core fibre long after manufacture even if one or both ends is left open because the pressure equalisation process is so impeded by the small features sizes in the fibre. Accordingly, a length of hollow core fibre with or without closed ends can be expected to comprise at least a portion of its length which is a negative pressure portion, in which the pressure is below or less than atmospheric pressure. With a closed end, the negative pressure portion will typically extend to or very close to the seal, according to how quickly the seal was formed. Hence, for a fibre closed at both ends, the negative pressure portion will correspond to most or all of the fibre's length. For an open end, which was not sealed after manufacture or from which a seal has been removed, the negative pressure portion will begin at some position inwardly spaced from the fibre end according to how long the fibre end has been exposed to atmosphere for pressure to equalize. For long fibres, such as the many kilometer lengths used for telecommunications applications, a large portion of the fibre will typically remain at negative pressure even if both ends are open, simply because most of the fibre is remote from an end and the equalisation process is so slow.

This negative pressure is believed to be the underlying cause of the additional loss that has been observed after cleaving hollow core fibres using the conventional technique. The initial robust or crude cutting action used to remove the seal from the end of a hollow core fibre lacks finesse and creates tiny glass shards (fragments, splinters, particles, slivers or similar) by crushing, cracking, splintering and otherwise damaging the cladding microstructure. At the same time, removal of the seal exposes the low pressure interior of the fibre to atmospheric pressure, and air flows inwardly into the voids in the fibre. This inflow of air carries the glass shards with it a short distance into the fibre, so that they deposit inside the fibre and act as sources of optical loss by scattering light and disrupting the intended configuration of the microstructure.

This explains the random nature of the additional losses observed. Each fibre will be exposed to different numbers and locations of shards. All shards might be removed by the first cleave so that the loss is stable from the start, while in other cases the shards may be carried further into the fibre so that multiple cleaves are required to remove all the contamination and stabilise the loss. The issue will arise regardless of hollow core fibre type, and so accounts for the occurrence of the additional loss in fibres made from both chlorine-containing glass and low-chlorine glass. It also explains how the additional loss recurs in a fibre which is resealed and then cut and cleaved again. A long fibre length inhibits pressure equalisation in a short time so the resealing still preserves a low pressure inside the fibre, allowing an inrush of air and glass shards when the new seal is cut off.

Figure 6A:
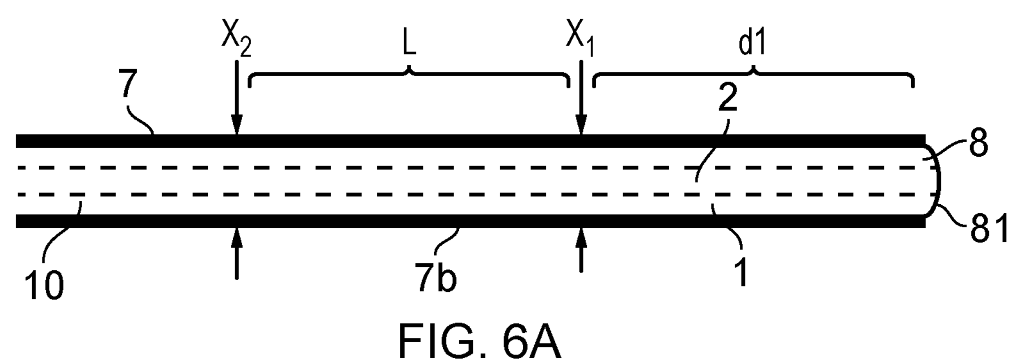
FIG. 6A to 6C show, as schematic longitudinal cross-sectional views, steps in a method for dividing a closed hollow core optical fibre by cleaving according to an example of the present disclosure.
Figure 6B:
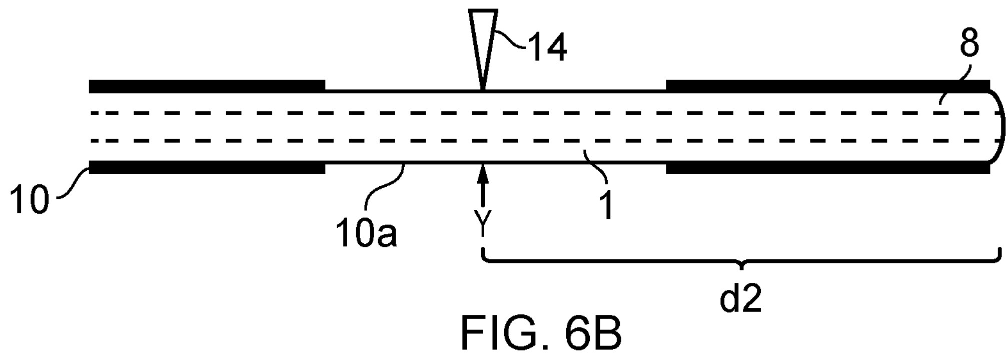
Figure 6C:
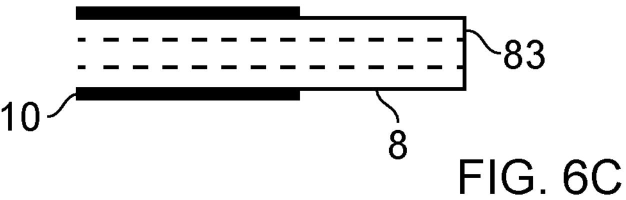

FIGS. 6A to 6C show, as schematic longitudinal cross-sectional views, steps in the preparation of a fibre end for use according to an example of a method proposed herein to address the above-described matter of additional loss arising from conventional fibre end preparation techniques.

FIG. 6A shows the end part of a length of hollow core fibre 10, comprising, as before, a hollow core 2 surrounded by a microstructured cladding 1. Again as before, the fibre 10 has a protective outer coating 7, and the fibre end 8 is closed or sealed, possibly hermetically, with a seal 81 at or near its end face. The sealed end may be protected by being packaged in a casing such as a tube (not shown). Hence, the hollow core fibre has the same features as the type of hollow core fibre to which conventional fibre end preparation techniques have been applied. A first step is hence to provide the fibre 10.

A second step is to remove a portion 7*b* of the coating 7 from the fibre 10. This is to provide a bare part of the fibre 10 where the outer surface of the cladding 1 is exposed and a cleave can be made. As shown in FIG. 6A, a portion 7*b* of coating 7 to be removed is identified. The portion 7*b* begins at a first position X1 which is spaced apart from the seal 81 of the fibre 10 (inwardly spaced, that is, in the direction towards the other end of the fibre) by a distance d1. The portion 7*b* extends from the first position X1 over a length L and terminates at a second position X2 spaced further apart from the seal 81, and closer to the other end of the fibre.

The portion 7*b* of the coating 7 is then removed, or stripped, from the fibre 10. The coating is removed from all around the full circumference of the fibre 10. Since the portion 7*b* is intermediate, in that it is spaced from the seal 81 at the end of the fibre 10 and leaves remaining regions of coating 7 on either side, its removal can be described as a "window strip". The removing or stripping of the coating 7 can be carried out in any convenient manner. For example, mechanical stripping devices and tools can be used, such as a purpose-made stripper such as commercially available three hole (tri hole) fibre optic strippers or other mechanically-based stripping tools (such as the PCS-100 polyimide coating stripper made by Fujikura), or other bladed tools or devices such as a razor blade, or heated mechanical ("hot jacket") strippers (such as the TSAB-40 made by Jonard Tools). Non-mechanical stripping techniques include the use of hot nitrogen or hot air to vaporize the coating (employed in the Autostripper 3™ made by Nyfors), and chemical removal using an appropriate acid. The stripping technique can be chosen having regard to factors including the material of the coating, the length L of the window to be stripped, and the environment in which the fibre end is being prepared.

FIG. 6B shows the fibre 10 after window stripping to remove the portion 7*b* of the coating 7. The fibre 10 now includes a length or "window" 10*a* of bare fibre of width L where the outer surface of the cladding 1 is exposed. This provides a good arrangement for making a successful cleave in the fibre 10. To further enhance the cleave quality, the bare surface of the fibre may be cleaned, using any conventional or suitable cleaning solvent, cleaning solution or cleaning fluid used in the optical and fibre optic industries. This cleaning step, while not essential, helps to remove surface debris and contaminants left on the fibre surface after stripping of the coating, which might otherwise be transferred to the end facet during the cleaving process. The seal 81 is still intact to close the end 8 of the fibre 10.

Once the fibre 10 is ready for cleaving, a location Y for a cleave is designated, within the region of the window strip, where the coating 7 has been removed. Hence, the cleave location Y is at a distance d2 from the seal 81 at the end 8 of the fibre 10, which is greater than d1, the spacing of the first edge of the window from the seal, and less than d1+L, the spacing of the second edge of the window from the seal. In other words, d1<d2<(d1+L). Since the purpose of the cleave is to divide the fibre into two parts, the cleave location Y can more generally be considered to be a divide location, at which the fibre is to be separated into a part on one side of the divide and another part of the other side of the divide.

Significantly, though, note that the cleave location is positioned within the negative pressure portion of the fibre. In this example, the fibre has a closed end which has been sealed directly after fibre manufacture, so the negative pressure conditions are preserved up to or close to the seal 81. Cutting the fibre at this location with scissors or similar according the initial step of the conventional cleaving technique described with regard to FIGS. 5A-5D will cause loss-creating shards to be drawn into the fibre's interior structure.

The cleave is then made at the location Y using a fibre cleaving tool or cleaver 14. Any suitable technique and tool or apparatus can be used, according to fibre type, situation, preference of the user and other factors, in order to provide a cleaved end facet. A range of fibre cleavers are commercially available, and make use of techniques including anvil-based cleaving (such as the CT-08 made by Fujikura) and tension-based cleaving (such as the CT-101/CT-102, also made by Fujikura). Hand-cleaving may be employed, for example using a score-and-bend approach with a ceramic tile. Laser cleaving is also known and may be used if desired.

FIG. 6C shows the fibre 10 after cleaving with the cleaving tool 14. A clean end facet 83 has been produced at the divide location, giving a new end for the fibre 8, created by removal of the seal 81 by the cleaving. The end facet is shown as square (orthogonal to the fibre length), but cleaving may be carried out at other angles if required. The fibre 10 has been divided into two parts, one to the right of the divide location Y (as illustrated) which comprises the closed end 8, and the other to the left of the divide location Y which comprises the bulk or majority of the length of the fibre 10. The separating of the fibre 10 by cleaving has removed the closed end part from the overall fibre.

Hence, the cleaved end facet is formed and the closed end is removed in a single step, that of cleaving within the negative pressure portion of the fibre, which in this example is also within the stripped window. The action of cleaving is configured so as to minimise or avoid cracking or crushing of the microstructure in the fibre, in order to create a clean and neat end facet. The procedure can therefore avoid the formation of the glass shards which are created by a simple cutting action with scissors or a knife. Hence, although the cleave performed in the negative pressure portion of the fibre opens up the previously sealed low pressure interior of the hollow core fibre so that there is an inflow of air from the surrounding environment to the inside of the fibre, there are no glass shards available to be drawn into the fibre by the air. Hence, the additional losses observed with conventional fibre end preparation are reduced or avoided.

As noted, the method may be considered more generally as dividing a hollow core fibre into two parts, by separating it at a divide location such as a cleave location which is positioned within a negative pressure portion of the fibre. Each part may have any length, and any length relative to the other part, as discussed further below. The method can, therefore, be used to remove a short end part from a fibre, divide a fibre in half to form two roughly equal parts, or make a division at any point between these extremes.

Figure 6D:
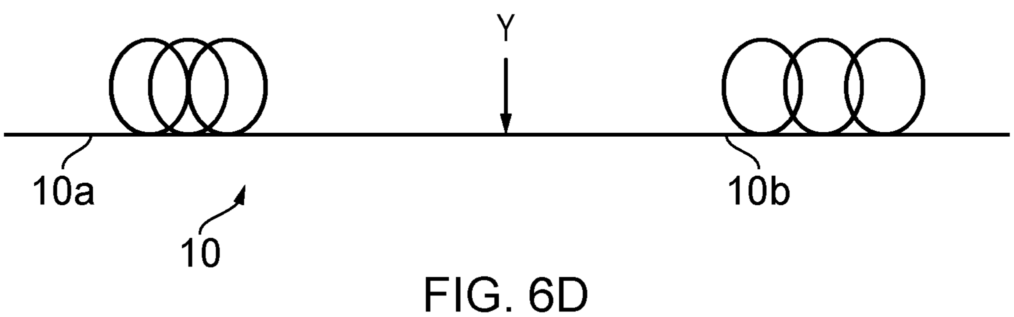
FIG. 6D shows a schematic view of a hollow core optical fibre to be divided at a divide location according to example methods of the present disclosure.

FIG. 6D shows a schematic side view of a hollow core optical fibre 10 of substantial length. A method as disclosed herein may be used to separate or divide the fibre 10 at a divide location Y so as to form two parts 10*a* and 10*b*. The divide location is at or near a mid-point of the fibre 10 so that each part has a roughly similar, and still substantial length. The divide location Y can be located anywhere along the fibre that lies within a portion of negative pressure.

In an experiment, loss measurements were made on fibres with 63 cleaves carried out in according the example method of FIGS. 6A-6C. Of these, 61 fibres showed no additional losses, indicated by a stable loss value being measured immediately so that further additional cleaves do not provide any reduction in loss. Measured additional loss was low in the remaining two fibres, and may have been attributable to other factors, for example one had an incorrect cleave angle.

The proposed method not only reduces loss when preparing the ends of hollow core fibres, but is also faster compared to the conventional technique since the cleaved end facet formation and removal of the sealed end are combined into a single step, rather than being separate stages as before. Also, the additional cleaves required to reach a stable loss position are avoided. Also, splicing the hollow core fibre to another fibre is simplified since power alignment techniques required to achieve a good splice in the presence of optical loss can be avoided. These techniques require access to the other end of a fibre for measurement of transmitted power and are therefore impractical for very long fibre lengths, and make installation of fibres more costly and time-consuming.

Note that the cleave may be produced to optical quality, ready for splicing the hollow core fibre directly to another fibre or optical component. However, the method is not limited in this way, and cleaving simply to produce a clean end facet is still highly useful regardless of the optical quality. Cleaving is a technique for separating hollow core optical fibre into two parts that avoids or minimises the formation of shards, so applying cleaving directly to a negative pressure portion of a hollow core fibre allows the fibre to be divided without contaminating the fibre interior with fragments of damaged microstructure. A fibre can hence be conveniently split into shorter parts or lengths without increasing the optical loss.

The length L (see FIG. 6A) of coating which is removed in the window strip, which may be thought of as the width of the window, can be selected for convenience depending on later processes to be applied to the fibre. For example, the window width may be chosen having regard to the intended cleaving technique which will be used. For many cleaving machines and tools, a window width which is up to 100 mm, for example in the range of 20 mm to 50 mm or in the range of 30 mm to 50 mm will be suitable. Somewhat smaller or larger windows may be preferred, for example having a width in the range of 10 mm to 20 mm, 10 mm to 30 mm, 10 mm to 40 mm, 10 mm to 50 mm, 10 mm to 60 mm, 10 mm to 70 mm, 10 mm to 80 mm, 10 mm to 90 mm or 10 mm to 100 mm; or 30 mm to 40 mm, 30 mm to 60 mm, 30 mm to 70 mm, 30 mm to 80 mm, 30 mm to 90 mm or 30 mm to 100 mm; or 50 mm to 70 mm, or 50 mm to 80 mm, or 50 mm to 90 mm, or 50 mm to 100 mm or 50 mm to 120 mm, or 50 mm to 150 mm. Smaller window sizes are not excluded, and may be practical in some cases, for example a window width of less than 1 mm, or less than 2 mm, or less than 3 mm, or less than 4 mm, or less than 5 mm, or less than 6 mm, or less than 7 mm, or less than 8 mm, or less than 9 mm, or less than 10 mm. Much large windows may also be useful, for example a window width greater than 100 mm, or greater than 150 mm, or greater than 200 mm. There is considerable flexibility in the width of window, and while a sufficient minimum width of coating which is compatible with the chosen cleaving technique may be required, larger windows may additionally accommodate other fibre processing stages.

The window strip, and hence the cleave, can be performed at any point along the length of the fibre. Often, a cleave near the end of a fibre will be desired, where the aim is to couple the fibre to another fibre or other component such as by splicing. In this case, the distance d1 by which the first edge of the window is separated from the seal at or near the end of the fibre can be relatively short, such as 100 mm or less, 150 mm or less, 200 mm or less, 300 mm or less, 90 mm or less, 80 mm or less, 70 mm or less, 60 mm or less, 50 mm or less, 40 mm or less, 30 mm or less, 20 mm or less or 10 mm or less. More generally, the method can be considered as useful for removing an end from a fibre, such as to take away a seal or closed end, or remove a damaged part. The fibre is therefore divided into a small or short part including an end which is not required (this part may be discarded), and a typically much larger or longer part which represents the fibre which is to be used for some application. Removal of an end part in this way might be defined as selecting the divide location to be 1 metre or less to an end of the fibre, where that end will typically be closed, but need not be. Other distances for end removal are not excluded, however.

In other circumstances, the method may be carried out for the purpose of dividing the fibre into two parts which are both relatively long and intended for use rather to be discarded. The cleave may therefore be at a divide location which is much further from an end of the fibre in order to divide the fibre into two separate parts of interest. This may be used to separate a very long fibre into two or more shorter lengths, such as when removing usable lengths of fibre from a reel or spool. As an example, each of the parts might have a length of at least 5 metres, although other minimum lengths are not excluded, such as 1 m, 2 m, 3 m or 4 m. As such, the window strip may be positioned so that the cleave separates the fibre near to or nearer to its mid point, such as within 5% of the fibre midpoint, or within 10%, within 20%, with 25%, within 30%, within 40% or within 50% of the fibre midpoint. Similar ranges apply to the distance d2 separating the cleave from the seal at the end of the fibre.

Note that while removal of an end part of the fibre, particularly if a very short end part, may require the fibre to have a closed end so that the divide location can be positioned within the negative pressure region, dividing the fibre at a location spaced apart from an end can be carried out on fibre with one or both ends open. As discussed above, hollow core fibre retains a negative internal pressure at least over a central portion even if the ends have been open for a long period. Hence, the method is applicable to both open ended and closed ended hollow core optical fibres.

As will be understood, the window width (length of removed coating) L, the window position or location d1 and the cleave position or location d2 are flexible and can be selected according to requirements.

Once the fibre has been cleaved, any further required steps can be carried out using the cleaved end. Oftentimes, this will be the formation of a fibre splice to join the cleaved fibre to another fibre or to an optical component or element, in the usual manner. The cleaved hollow core fibre may be spliced to another hollow core fibre of the same type or a different type, or to a solid optical fibre, for example to accommodate connection to optical telecommunications apparatus which may be configured for use with all solid fibres.

The hollow core fibre to which the method is applied may be in any format, any design (ARF or HCPBF), and of any length. For example, the fibre may be an individual fibre. Alternatively, the fibre may be bundled with other fibres in a fibre cable, the bundle being held together within an outer jacket. In this case, a sufficient length of the fibre may already protrude from the jacket to allow the cleave to be made. Otherwise, a preliminary step may be the freeing of a portion of the fibre from the jacket in order to perform the cleaving method. This could be removal of a portion of the jacket from an end of the cable, or by removing a portion of the jacket from an intermediate or midpoint of the cable, similar to the window strip of the coating from the fibre. This latter option enables division of the cable into two parts, or gives optical access to a fibre at an intermediate location spaced apart from the fibre ends, for example. Otherwise, the fibre might be freed by opening the jacket to reveal the fibre, such as cutting a slit in the jacket at an end of the cable or spaced inwardly from the end to give access to the fibre.

Thus far, the method has included the step of window stripping the coating from the fibre before cleaving the fibre. As noted, prior removal of the coating can give a better quality end facet. However, some cleaving techniques are able to separate the coating material at the cleave location, as well as separating the fibre material, and in some circumstances it may be suitable to perform this cleave in this way, without prior removal of the coating. Therefore, in another example, the method comprises cleaving a coated hollow core fibre at a divide location spaced apart (by the distance d2) from the sealed end of the hollow core fibre. The coating may then be stripped from the end of the fibre adjacent to the cleaved end facet if required for further processing, such as splicing. This approach may be quicker, and therefore attractive in some circumstances. For example, a temporary splice may need to be made for which the quality requirement is not high, so that any risk of contaminating the end facet with coating material by cleaving through the coating is acceptable. This example may also be used to divide a fibre into two substantial parts, rather than removing an end part. As before, in either case, the end or ends of the fibre may be closed or open.

On the other hand, the method is also useful for uncoated hollow core fibre. While an outer coating is required in many instances in order to protect the fibre, in other cases it may not be necessary. Cleaving in a negative pressure portion according to the current disclosure still offers the same effect of reduced additional loss by avoiding contamination of the fibre interior with shards from the microstructure, however. Hence, in another example, the method comprises cleaving an uncoated hollow core fibre at a location spaced apart (by the distance d2) from the sealed end of the hollow core fibre. Again, this example may also be used to divide a fibre into two substantial parts, rather than removing an end part, with the end or ends of the fibre being closed or open.

FIG. 7 shows a flow chart of steps in a first example method for cleaving an optical fibre. In a first step S1, a hollow core optical fibre is provided. The optical fibre has a (optionally hermetically) sealed end (its other end may or may not be sealed), and may or may not have an outer coating. In a second step S2, the fibre is cleaved at a location spaced apart from the sealed end, in order to provide an end facet for the fibre.

FIG. 8 shows a flow chart of steps in a second example method for cleaving an optical fibre. In a first step S10, a hollow core optical fibre is provided. The optical fibre has a (optionally hermetically) sealed end (its other end may or may not be sealed), and an outer coating. In a second step S11, a portion of the coating is removed at a location spaced apart from the sealed end, thereby providing a window of exposed uncoated fibre. In a third step S12, the fibre is cleaved at a location within the window, and therefore also spaced apart from the sealed end, in order to provide an end facet for the fibre.

FIG. 9 shows a flow chart of steps in a third example method for cleaving an optical fibre. In a first step S10, a hollow core optical fibre is provided. As in the second example, the optical fibre has a (optionally hermetically) sealed end (its other end may or may not be sealed), and an outer coating. In a second step S13, rather than removing a portion of coating to form a window, the fibre is cleaved directly through the coating at a location spaced apart from the sealed end, in order to provide an end facet. In an optional third step S14, a portion of the coating is removed from the fibre adjacent to the end facet.

Figures 10, 11:
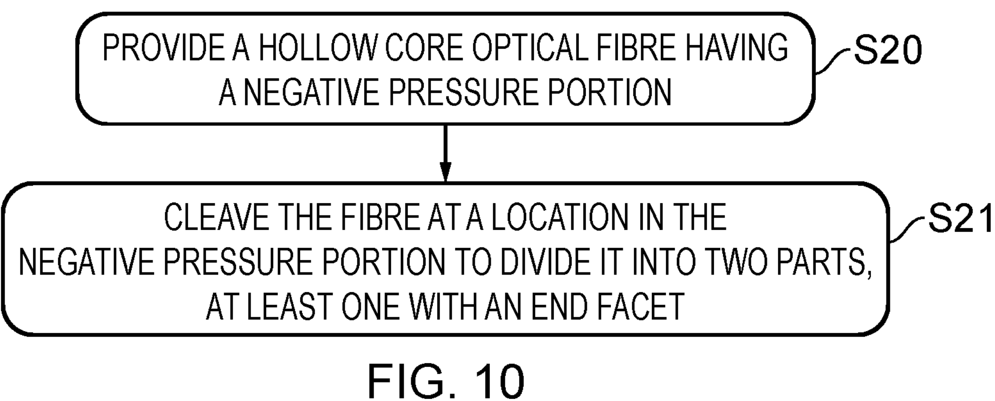
FIG. 10 shows a flow chart of steps in a fourth example method for dividing a hollow core optical fibre with a negative pressure portion.
FIG. 11 shows a flow chart of steps in a fifth example method for dividing a hollow core optical fibre with a negative pressure portion.

FIG. 10 shows a flow chart of steps in a more general example method for dividing a hollow core optical fibre by cleaving. In a first step S20 a hollow core optical fibre is provided which includes a negative pressure portion in which the internal pressure is below atmospheric pressure. The fibre may have closed ends or open ends, or one closed end and one open end. In a second step S21, the fibre is cleaved at a divide location which is positioned within the negative pressure portion to divide the fibre into two parts. This provides an end facet at the divide location for at least one of the parts.

The benefits of dividing or separating a hollow core fibre with negative internal pressure into two parts in a manner which avoids or reduces contamination from shards of material from the microstructure are not limited to cleaving techniques, however. While cleaving may be useful in that it can also provide an optical quality end facet on at least one of the fibre parts, cleaving itself can be carried out in such a way as to divide the fibre as required but without an end facet of optical quality being produced directly from the cleave. Also, other techniques able to separate or divide a fibre into parts which can be carried out without damaging the microstructure in a way that produces shards or other fragments of material can be used in place of cleaving.

Any separating technique which is or can be configured to eliminate, avoid, reduce, prevent, inhibit, or exclude the formation or creation of shards from the microstructure may be employed to divide a hollow core optical fibre at a location within a negative pressure portion of the fibre. As an example, thermal processes or techniques may be used, which deliver heat energy to the hollow core fibre to soften or melt the glass of the fibre. The softened or molten region of the glass allows the two parts of the fibre to be separated from one another, such as by pulling apart. The heat energy may come from a flame or laser beam, for example. The separated ends of the fibre will lack any usable end facet, but cleaving may be performed later if required. Alternatively, a laser beam may deliver enough heat energy to vaporise or ablate the glass, thereby cutting through the fibre in a non-contact manner. This can be referred to as laser cleaving. In all cases, the absence of contact with the fibre and hence lack of applied force avoids cracking, crushing or splintering of the microstructure so that shards are not formed.

FIG. 11 shows a flow chart of steps in a further example method for dividing a hollow core optical fibre. In a first step S30 a hollow core optical fibre is provided which includes a negative pressure portion in which the internal pressure is below atmospheric pressure. The fibre may have closed ends or open ends, or one closed end and one open end. In a second step S31, a separating technique is applied to the fibre, the technique being configured to separate without forming shards from the microstructure; shard formation is intended to be avoided or eliminated. In a third step S32, the separating technique separates the fibre at a location in the negative pressure portion so as to divide the fibre into two parts.

This example method can be used in conjunction with any of the various features discussed for cleaving, such as the fibre have open or closed ends, and the parts being a short end part and a longer part, or two longer parts.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] U.S. Pat. No. 9,904,008

[2] WO 2015/185761

[3] J Broeng et al, "Analysis of air-guiding photonic bandgap fibers", Optics Letters vol. 25(2), 96-98, 2000

[4] Francesco Poletti, "Nested antiresonant nodeless hollow core fiber," Opt. Express, vol. 22, 23807-23828, 2014

[5] JR Hayes et al, "Antiresonant hollow core fiber with an octave spanning bandwidth for short haul data communications", Journal of Lightwave Technology vol. 35(3), 437-442, 2017

[6] S Rikimi et al, "Growth of ammonium chloride on cleaved end-facets of hollow core fibers", 2020 Conference on Lasers and Electro-Optics (CLEO), IEEE, 2020.

[7] U.S. Pat. No. 6,888,992

[8] S Rikimi et al, "Pressure in as-drawn hollow core fibers", Advanced Photonics Congress, Optical Society of America, 2020

The invention claimed is:

1. A method for dividing an optical fibre, comprising:

providing a hollow core optical fibre having a length, a cladding which comprises a microstructure, a hollow core surrounded by the cladding, and a negative pressure portion in which the pressure is below atmospheric pressure that extends over at least a portion of the length; and cleaving the hollow core optical fibre at a divide location of the fibre at which the pressure is below the atmospheric pressure to divide the hollow core optical fibre into two parts and provide an end facet at the divide location on a first part of the two parts.

2. The method according to claim 1, wherein the cleaving provides the end facet on the first part such that the first part is suitable to be spliced to another optical element.

3. The method according to claim 1, wherein the hollow core optical fibre has at least one closed end for inhibiting ingress of contaminants into the cladding and/or the hollow core.

4. The method according to claim 3, wherein the at least one closed end is closed by a hermetic seal.

5. The method according to claim 3, wherein the divide location is within 1 metre of the at least one closed end so that dividing the hollow core optical fibre into the two parts removes a part with the closed end from a longer part of the hollow core optical fibre.

6. The method according to claim 5, wherein the divide location is 300 mm or less from the at least one closed end.

7. The method according to claim 1, wherein each of the two parts has a length of at least 5 metres.

8. The method according to claim 1, wherein the hollow core optical fibre comprises a coating around the cladding.

9. The method according to claim 8, wherein, before cleaving the hollow core optical fibre, the method further comprises:

removing a portion of the coating from around the cladding at a window location within the negative pressure portion to expose a window of cladding;

and wherein the divide location is within the window.

10. The method according to claim 9, comprising removing the portion of the coating from around the cladding using a mechanical optical fibre stripping device.

11. The method according to claim 9, comprising removing the portion of the coating from around the cladding using a non-mechanical optical fibre stripping technique.

12. The method according to claim 9, wherein, after removing the portion of the coating and before cleaving the hollow core fibre, the method further comprises cleaning an outer surface of the cladding in the window including cleaning at the divide location.

13. The method according to claim 9, wherein the window has a width along the hollow core optical fibre of 100 mm or less.

14. The method according to claim 9, wherein the window has a width along the hollow core optical fibre in the range of 20 mm to 50 mm.

15. The method according to claim 8, wherein cleaving the hollow core optical fibre comprises cleaving the coating.

16. The method according to claim 15, further comprising, after cleaving the hollow core optical fibre, removing a portion of the coating from around the cladding adjacent to an end of one of the parts.

17. The method according to claim 1, wherein the hollow core optical fibre is an antiresonant hollow core optical fibre.

18. The method according to claim 1, wherein the hollow core optical fibre is a photonic bandgap hollow core optical fibre.

19. A method for dividing an optical fibre, comprising:

providing a hollow core optical fibre having a length, a cladding which comprises a microstructure, a hollow core surrounded by the cladding, and a negative pressure portion in which the pressure is below atmospheric pressure that extends over at least a portion of the length; and separating the hollow core optical fibre at a divide location of the fibre at which the pressure is below the atmospheric pressure to divide the hollow core optical fibre into two parts, using a separating technique configured to avoid formation of shards from the microstructure.

20. The method according to claim 19, wherein the separating technique comprises delivering heat energy to the hollow core optical fibre.

* * * * *